Jan. 27, 1970     J. BERGEY ET AL     3,491,601
ESCAPEMENT ACCELEROMETER Filed Dec. 14, 1965     5 Sheets-Sheet 1

INVENTORS.
JOHN BERGEY
RAYMOND J. ANATER

BY     ATTORNEYS.

INVENTORS.
JOHN BERGEY
RAYMOND J. ANATER

BY

ATTORNEYS.

INVENTORS.
JOHN BERGEY
RAYMON J. ANATER

BY *Le Blanc and Shur*

ATTORNEYS.

FIG. 10

ESCAPEMENT ACCELEROMETER
ACCELERATION VS.
NO. OF PULSES AND DEFLECTION

INVENTORS.
JOHN BERGEY
RAYMOND J. ANATER

United States Patent Office 3,491,601
Patented Jan. 27, 1970

3,491,601
ESCAPEMENT ACCELEROMETER
John Bergey, Lancaster, and Raymond J. Anater, Akron, Pa., assignors to Hamilton Watch Company, a corporation of Pennsylvania
Filed Dec. 14, 1965, Ser. No. 513,726
Int. Cl. G01p 15/08
U.S. Cl. 73—517        12 Claims

ABSTRACT OF THE DISCLOSURE

The invention is an escapement accelerometer in which an inertial mass drives a verge escapement through a reduction gear system. A photoelectric detector senses movement of the escapement and produces a pulsed output having a frequency which is a function of acceleration. A counter counts the pulses. A timer periodically resets the counter, and a recorder records the count in the counter at the time of resetting.

---

This invention relates to accelerometers and more particularly to an inertially driven, mechanically regulated, and electrically instrumented device capable of transducing sensed inertial forces into a form usable in electronic circuitry.

Accelerometers are well known and are used in a variety of applications, such as in rocketry, telemetry, virbration sensing, and for many other purposes. Very often, the accelerometer employs a piezoelectric element such as quartz crystal or the like for transducing inertial forces into electrical charge signals capable of detection by electronic equipment. However, transducers of this type have certain disadvantages, among which is the fact that they do not continuously follow constant accelerations and are ordinarily not readily adapted to digital ouputs particularly suited for use in telemetry and environmental data processing. The present invention avoids these and other difficulties by providing a novel accelerometer device incorporating an inertial drive weight, a gear train, escapement and electric pulse generator. The output of the unit is a series of electronic pulses which pulses have a frequency proportional to the sensed inertial force. Additional important features include the fact that the unit is reasonably accurate, can be made quite small, is comparatively inexpensive, possesses low power consumption, is impervious to rugged environments, and can be readily reduced to conventional hardware.

In the device of the present invention, an inertial drive weight acts through a torque reduction gear train against a verge or run-away escapement such that the oscillating frequency of the escapement is proportional to acceleration. This frequency is sensed by a photosensitive system which periodically passes light from a source through a hole in the rim of the escape pallet, to a photosensitive detector producing an electrical pulse output indicative of pallet frequency. These pulses are then passed through electrical circuitry where they are shaped, integrated and amplified before being applied to a suitable recorder.

The technique used to convert the output pulses to usable information is dependent upon the particular application for the accelerometer. It is possible for instance to telemeter the frequency information in digital form from a missile to a ground control station where corrections in the flight path can be determined. In this case, the electronic circuitry may be separated from the remainder of the accelerometer. In other applications, it is sometimes advantageous to provide a complete package including electronic circuitry. For example, in a manned space ship, the frequency information can be fed directly into a computer and the electronics form an integral part of the accelerometer package. In addition, to digital information, the frequency of the pallet may also be readily indicated in analog form in situations where a dynamic picture of the acceleration signature is desired.

Other uses for the device of the present invention center around situations where linear acceleration is present and requires continuous measurement. For example, it is quite useful in new high-speed transit train systems to feed acceleration data to a speed control computer. Since the train acceleration is a function of cargo or passenger load, terrain and other variables, the top acceleration value for passenger comfort and/or stress considerations is important and can be ascertained with the instant device. It also can be used to measure acceleration and deceleration signatures on rocket sleds where continuous monitoring of acceleration is desired or where it is desirable to continuously follow constant accelerations or decelerations.

It is therefore one object of the present invention to provide a novel and improved accelerometer.

Another object of the present invention is to provide a novel escapement controlled accelerometer.

Another object of the present invention is to provide a rugged, light weight low power accelerometer particularly suited for aerospace applications.

Another object of the present invention is to provide a novel and improved accelerometer for producing either electronic digital or analog output signals.

Another object of the present invention is to provide an escapement accelerometer incorporating photosensitive detection of the oscillating frequency of a verge escapement. In the present invention, the inertia weight senses the acceleration force imparted to the escapement accelerometer packabe through the means of a pivoted lever. The inertia weight transmits the resulting torque through a step-up gear train. An escapement receives this torque and converts it into mechanical oscillation of an escape pallet.

The oscillation of the escape pallet is converted to an electrical signal by a pulse generator. The generated signal is then accumulated in an integrator and finally applied to a suitable recorder. Sensing of the oscillating frequency of the verge escapement or oscillating pallet is accomplished by providing an aperture in the pallet adapted to pass light impulses from a suitable light source to a photodiode or other photosensor which is pulsed each time the pallet moves to a position such that the light from the source passes through the pallet aperture and impinges on the photodetector.

These and further objects and advantages of the invention will be more apparent upon reference to the following specification, claims and appended drawings, wherein:

Figure 1:
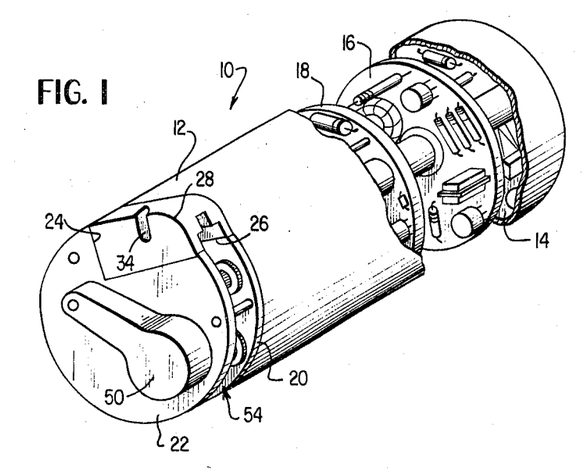
FIGURE 1 is a perspective view with parts broken away showing the complete escapement accelerometer package of the present invention.
Figure 4:
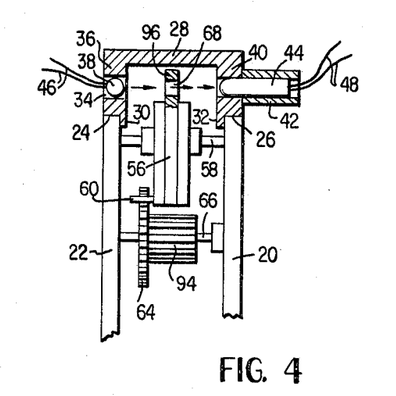
FIGURE 4 is an enlarged view of a portion of the mechanism illustrated in FIGURE 3.

Referring to the drawings, the novel escapement accelerometer of the present invention is generally indicated at 10 in FIGURE 1 and comprises a casing 12 housing the electronic circuitry described below and illustrated in FIGURE 1 as mounted on a plurality of circular insulating boards such as boards 14, 16 and 18. Secured to one end of the casing are a pair of spaced flat circular plates 20 and 22 provided with aligned notches or cut-outs 24 and 26 adapted to receive an optical mount 28. Mount 28 supports an optical system and is provided with a pair of flanges 30 and 32 as best seen in FIGURE 4 which overlie the edges of plate cut-outs 24 and 26 so that when the plates are clamped together mount 28 is securely held between the plates and to the remainder of the accelerometer package.

Suitably received in aperture 34 formed in the outer leg 36 of mount 28 is a light source 38. The other leg 40 of the mount is provided with a similar aperture and with an extension 42 which projects into the casing 12 and which aperture and extension combine to house a photodiode 44. Electrical energy is supplied to the light source 38 by way of leads 46 and an output signal is taken from the photodiode by way of leads 48.

Figure 2:
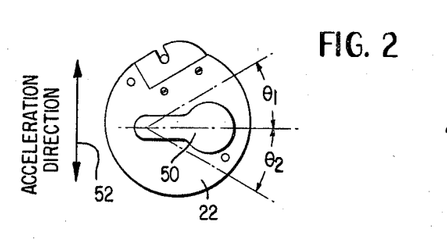
FIGURE 2 is a front elevation of the drive weight portion of the accelerometer of FIGURE 1.
Figure 3:
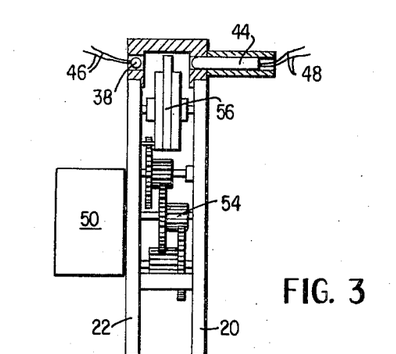
FIGURE 3 is a side view of the mechanical portion of the accelerometer of FIGURE 1.

Pivotally mounted to the outside surface of front plate 22 is a drive weight 50 which constitutes an eccentrically mounted inertial mass sensitive to acceleration forces in the direction of the double ended arrow 52 shown in FIGURE 2. This mass is coupled to a torque reduction gear train generally indicated at 54 in FIGURES 1 and 2, and through the gear train to a verge escapement including escape pallet 56. Pallet 56 is rotatably mounted on a shaft 58 received in plates 20 and 22 and this pallet carries a pair of pins 60 and 62, best seen in FIGURE 5, which when the pallet oscillates are adapted to alternately engage the teeth of an escape gear 64 rotatably mounted on shaft 66 similarly supported by spaced plates 20 and 22. The pallet is provided with a light hole or aperture 68 such that when the pallet passes through a proper predetermined position, aperture 68 passes light from the source 38 to the photodiode 44.

Figure 5:
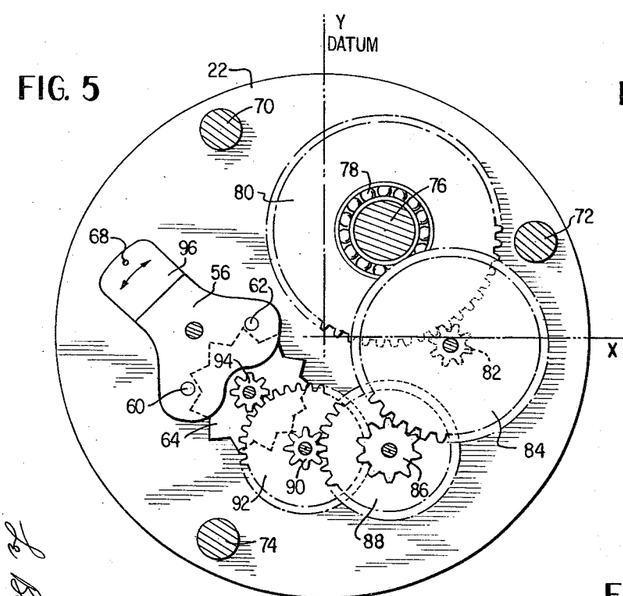
FIGURE 5 is a plan view showing the escape pallet and gear train and their relationship in the mechanical portion of the accelerometer.

Referring particularly to FIGURE 5, the two plates are connected together by three pillar posts 70, 72, and 74 suitably spaced around the periphery of the plates at 120° intervals. Eccentric weight 50 of FIGURE 1 is mounted on a drive shaft 76 journalled in outer plate 22 by ball bearings 78. Carried by shaft 76 is a large gear 80 which meshes with the teeth on a pinion 82 rotatably supported between plates 20 and 22. Rotatable with pinion 82 is a gear 84 in turn meshing with a pinion 86 rotatable with a further gear 88 of the gear train. Gear 88 in turn meshes with pinion 90 mounted between the plates to rotate with gear 92. The teeth of gear 92 mesh with the teeth of an escape pinion 94 mounted on shaft 66 of FIGURE 4 to rotate with the escape wheel or gear 64. Gear 64 is adapted to alternately engage the pallet pins 60 and 62. As indicated in FIGURE 4, pallet 56 may be of laminated construction and includes a center plate 96 in which light passing aperture 68 is formed.

In operation, the inertial drive weight 50 senses any change in velocity, i.e., acceleration by imparting a resultant torque into the first stage of the rigidly attached four stage gear train 54. The amplitude of this torque is determined by the product of the weight of the inertial sensor 50 when at rest, times the number of gravitational units imposed to the system, times the moment arm distance from the centroid of the inertial weight 50 to its pivot point, i.e., the center of shaft 76.

The gear train transmits the decreased torque, increased wheel speed into the verge escapement sometimes called a run-away escapement. This is a timing device with a cyclic regulator that does not execute simple harmonic motion. The escapement consists of the toothed escape wheel 64 actuated by an applied torque and the pallet 56 with the two pallet pins or teeth 60 and 62. The pallet oscillates without a restoring spring force.

When the escape wheel turns, one pallet tooth is pushed along the escape wheel tooth. The other pallet tooth then engages the escape wheel. A torque applied to the escape wheel causes the oscillating system to operate like a governor because the mass of the pallet must be driven through a restricted path. All changes in torque alter the frequency of oscillation of the verge escapement.

The frequency of pallet oscillation, $f$, may be calculated from the torque, T, on the escape wheel if it is assumed that the pallet tooth or pin and escape wheel impact is inelastic, the half cycles of the pallet are equal in time, and the friction is negligible.

If:

$\phi$=the angle between the extreme positions of the pallet in radians
I=the moment of inertia of the oscillating mass in slug-in$^2$
$r_w$=the radius of the escape wheel in inches and
$r_p$=the radius of escape pinion in inches then;

$$f = \frac{1}{2}\sqrt{\frac{Ir_p/r_w}{2I\phi}}$$

Thus, the frequency varies as the square root of the torque since all other terms are constant. The usable torque on the other hand is dependent on factors in addition to those previously discussed. These factors include center-to-center distance between escape wheel and pallet, radius of the pitch circle of the escape wheel, friction in the gear train, and the amount of "run-in" of the escapement. These factors can be selected on an empirical basis to produce optimum results.

The configuration described in FIGURES 1 through 5 has a slightly varying moment arm because of the curved path of eccentric mass 50. This error is normally averaged out by the fact that the initial position of the mass is adjusted so that the amount of travel on one side of a perpendicular to the acceleration field is approximately equal to the amount of travel on the other side of that same field. That is, for a particular application, the movement of the inertial mass can be selected so that the mass moves through substantially equal angles $\theta 1$ and $\theta 2$ in FIGURE 2 on opposite sides of a plane perpendicular to the acceleration field represented by the arrow 52 in that figure.

Figure 6:
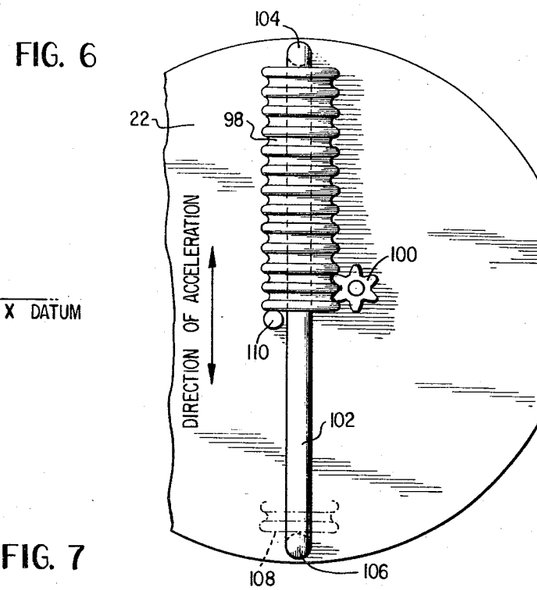
FIGURE 6 is a plan view of a rack and pinion modification drive assembly for the accelerometer of FIGURE 1.
Figure 7:
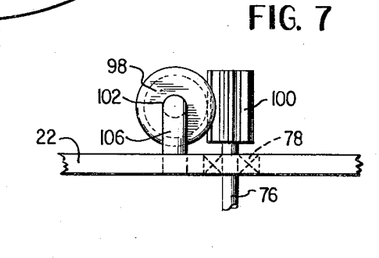
FIGURE 7 is an end view of the rack and pinion assembly of FIGURE 6.

FIGURES 6 and 7 illustrate a modified construction which can be employed to overcome this feature, such that the movement of the inertial weight is linear rather than through a curved path. In FIGURES 5 and 6 plate 22 is shown as supporting a toothed ball bushing rack 98 and a pinion 100. Rack 98 is adapted to slide along a guide bar 102 secured at one end to plate 22 by a first leg 104 and at its other end to the plate by a second leg 106. Rack 98 in this case constitutes the inertial drive mass and is adapted to move from the solid line position illustrated in FIGURE 6 to the dashed line position indicated at 108. It is mounted on rod 102 by a ball bushing (not shown) so that it may readily move along guide bar 102. Disclosed in FIGURE 6 is a release pin 110 (optional) which may be manually removed when the accelerometer is ready for use and movement of rack 98 under the influence of acceleration forces along guide bar 102 causes the rack teeth to rotate pinion 100 and through the shaft 76 to drive the gear train and eventually oscillate the pallet 56 in the manner previously described. The input torque to the gear train is in this case constant for any given vector acceleration. It should be noted that in either case, the input to the gear train is continuous and follows the acceleration field imposed on the system package. This is not true for many other types of accelerometers such as piezoelectric devices which require a change in acceleration to perform satisfactorily.

Figure 8:
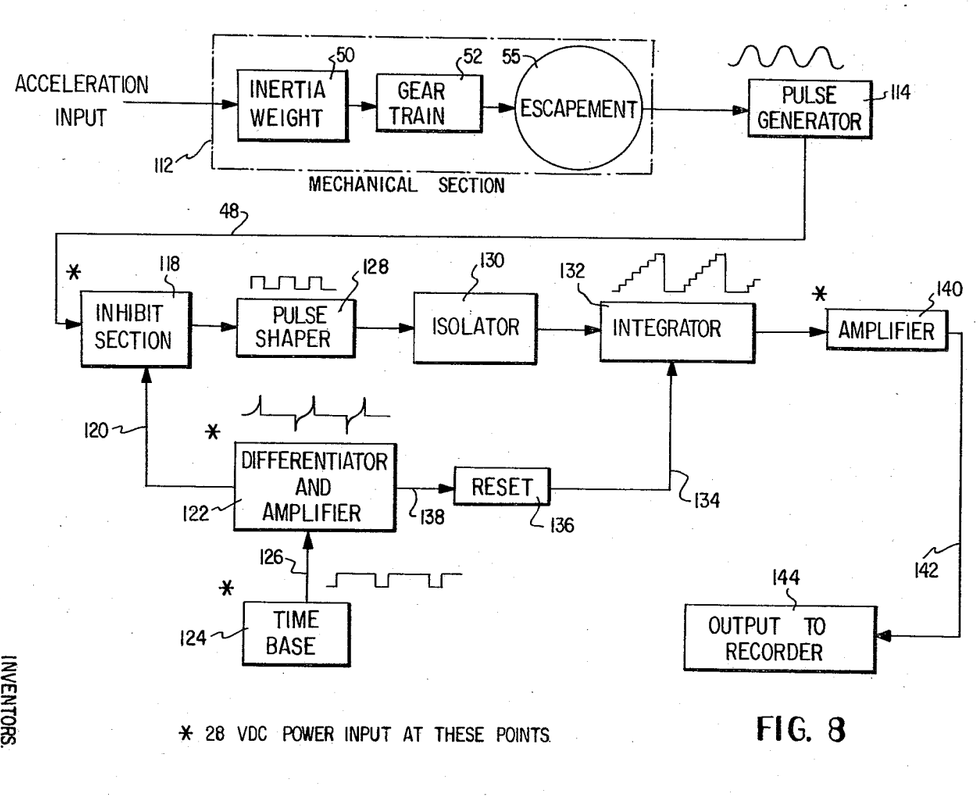
FIGURE 8 is a functional block diagram of the accelerometer of FIGURE 1 showing the relationship between the mechanical and electrical elements of the device.

FIGURE 8 is a functional block diagram of the overall accelerometer system with the mechanical section of the system previously described including inertial weight 50, gear train 52 and escapement 55 enclosed in the dashed box 112. The output from the mechanical system is transduced into electrical signals by a pulse generator 114. The output from the pulse generator passes by way of leads 48 in FIGURE 3 from the photodiode to the input of an inhibit circuit 118. A second input to inhibit circuit 118 is by way of lead 120 from a differentiator and amplifier 122. Differentiator and amplifier 122 is controlled from a time base generator 124 supplying time base signals over lead 126.

The output from the inhibit circuit 118 passes through a pulse shaper 128 and isolator 130 to an integrator 132. Integrator 132 receives a second input by way of lead 134 from a reset circuit 136 connected to the output of differentiator and amplifier 122 by lead 139. Integrator 132 feeds an amplifier 140 and the signal passes from the amplifier by way of lead 142 to an output circuit 144 feeding a suitable recorder.

The theory of the overall operation of the escapement accelerometer can be best understood from a consideration of the functional block diagram of FIGURE 8. The mechanical portion consists of the inertial weight 50, gear train 52 and escapement 55. All other functions represented in FIGURE 8 are electronic in nature.

The inertial weight senses the acceleration force imparted to the escapement accelerometer package through the pivoted lever arrangement previously described. The inertial weight transmits the resulting torque through a step-up gear train 52. Escapement 55 receives this torque and converts it to a mechanical oscillation of the pallet.

The oscillation of the escapement is converted to an electrical signal by the function block 114 in FIGURE 8 designated as the pulse generator which block corresponds to the light source 38 and photodiode 44 and associated elements previously described. The generated signal enters the inhibit circuit 118 which controls the availability of this signal to the pulse shaper 128. The function of the pulse shaper is to provide a discrete pulse of specific amplitude and duration for each input pulse from the pulse generator. Thus, the output from the pulse shaper varies only in frequency though the input pulse may vary in other respects. The isolator circuit 130 provides electrical isolation between the integrator 132 and any other direct current voltage present in the system.

The integrator 132 accumulates the incoming pulses for a discrete period of time. Thus, the charge level on the integrator at any particular time indicates the number of pulses sensed from the beginning of a time period to the time of interrogation. Since the number of pulses is a function of frequency, this measurement portrays the acceleration level.

The function block 124 in FIGURE 8 labeled time base provides the constant period for pulse accumulation. This time base is preferably a free-running multivibrator and feeds its output to the differentiator and amplifier section 122. The purpose of the differentiator is to take the time base pulses and provide triggering signals, at the required level, to the inhibit and integrator circuits. The latter circuit receives its time base triggering pulse through the reset circuit 136. This reset circuit assures integrator operation from a ground or zero level reference. Amplifier 140 boosts the periodic integrator output to a usable signal level for a recorder.

Figure 9:
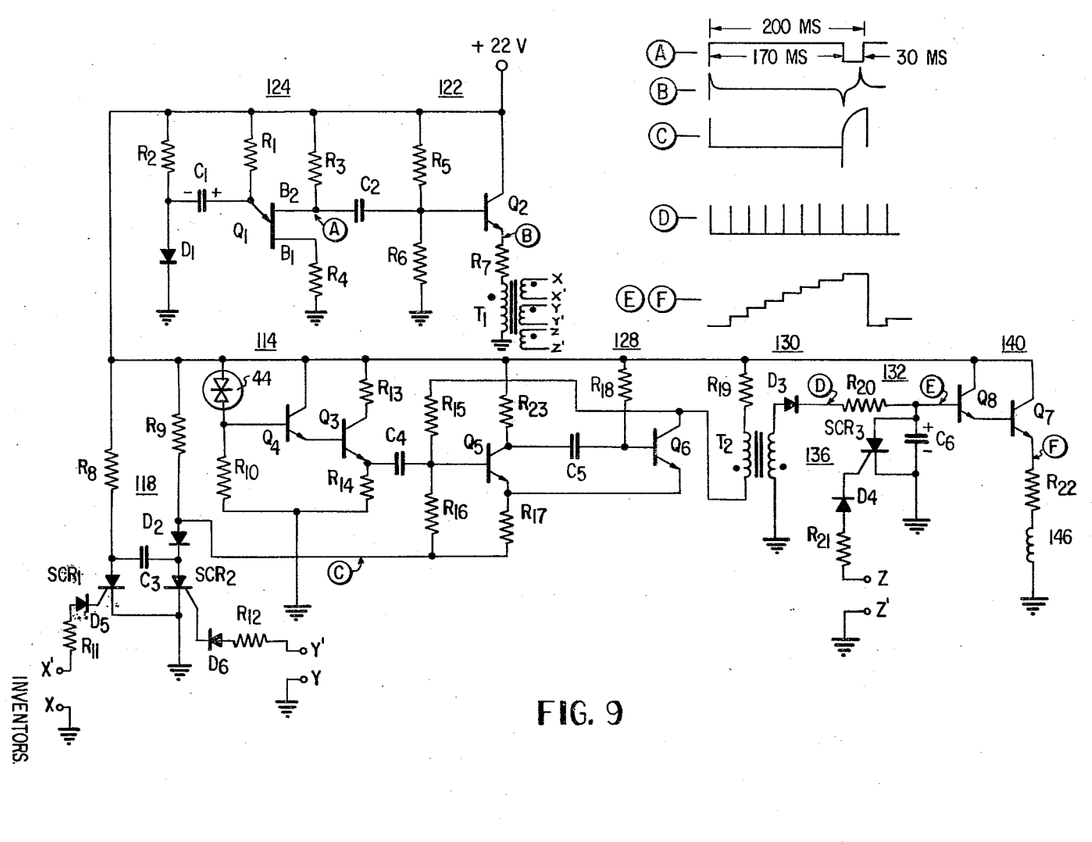
FIGURE 9 is a detailed circuit diagram showing the electronic circuitry for the accelerometer of FIGURE 1 and indicating the waveforms at different locations in the circuit.

FIGURE 9 is a detailed circuit diagram of the electronic portion of the escapement accelerometer with like parts bearing like reference numerals, i.e., those parts previously indicated either in the mechanical description or in the function block diagram of FIGURE 8 are similarly labeled in FIGURE 9. Pulse generator 114 consists of a 1N2175 light sensor 44, a subminiature incandescent light source 38 (FIGURES 3, 4) and a 0.010 inch hole in the oscillating arm of the pallet. Mechanical oscillations of the pallet are converted to electrical pulses as the pallet hole momentarily passes the oppositely aligned light sensor and light source. This pulse generator can also employ a gallium arsenide energy source and an infrared detector. In either case, the light source causes a change in the dynamic resistance of the light detector as the source is exposed momentarily through the hole in the pallet. This change in resistance is reflected as a change in voltage across resistor $R_{10}$ in FIGURE 9 to the base of transistor $Q_4$. Transistors $Q_3$ and $Q_4$ and their associated resistors provide a high impedance buffer for the photodiode circuit.

The time base circuit 124 is a unijunction transistor (UJT) multivibrator. It consists of unijunction transistor $Q_1$, capacitor $C_1$, diode $D_1$ and resistors $R_1$, $R_2$ and $R_3$ in FIGURE 9. The purpose of this circuit is to control the periods during which the output frequency of the escapement accelerometer is being sampled. Operation of the time base circuit is as follows: At time $t_0$ power is applied to the circuit. Capacitor $C_1$ charges through resistor $R_1$. The emitter voltage is very nearly equal to the voltage on the capacitor since the diode $D_1$ is forward biased and represents a small impedance compared to resistor $R_2$. When the voltage at the emitter increases to a level determined by the characteristic of the UJT, it is triggered on. Current flow into the emitter reduces the interbase resistance of the UJT. This results in an increased voltage drop across resistor $R_3$. Component values are selected such that the time between $t_0$ and the time the UJT is triggered on is 170 milliseconds. After the UJT conducts, the emitter potential falls rapidly to a value equal to the emitter-base 1 voltage drop. The diode is then reverse biased by the amount of the charge of the capacitor $C_1$. Capacitor $C_1$ then begins discharging through resistor $R_2$.

The emitter current consists of the current through resistor $R_1$ plus the capacitor discharging current. This is sufficient to maintain the UJT in the conducting state. As the charge on the capacitor is dissipated, the diode becomes forward biased and the emitter current decreases to cut-off. The UJT returns to the non-conducting state and the inter-base resistance increases. This is reflected in a positive going voltage across resistor $R_3$. The values of the components are selected such that the interval between the time the UJT conducts and the time it returns to the non-conducting state is 30 milliseconds. The output wave shape is taken from the $R_3$–$B_2$ junction indicated at A in FIGURE 9 and is shown graphically in that figure.

Coupling capacitor $C_2$ and resistor $R_6$ differentiate the output from the time base oscillator 124. Transistor $Q_2$ amplifies the differentiated signal and drives the control transformer $T_1$. The output wave shape at the emitter of transistor $Q_2$ is indicated at B in FIGURE 9. Transformer $T_1$ provides voltage isolation between transistor $Q_2$ and the various circuits which are controlled by the time base 114.

Capacitor $C_3$, controlled rectifier $SCR_1$, controlled rectifier $SCR_2$, and their gate components comprise the inhibit circuit 118. This circuit is controlled by the time base and differentiator and its function is to deactivate the pulse shaper network 128 at the proper intervals. The gates of both SCR's contain a secondary winding of transformer $T_1$. The polarity of the winding in the gate of $SCR_1$ is the reverse of the winding in the gate of $SCR_2$. Consequently, a positive pulse into the transformer primary triggers $SCR_2$ and a negative pulse into the primary triggers $SCR_1$. The load for $SCR_1$ is resistor $R_8$. The load for $SCR_2$ is the pulse shaper circuit 128. Therefore, the pulse shaper circuit 128 is operational only when $SCR_2$ is conducting. The operation of the inhibit circuit 118 is as follows:

Assume that both $SCR_1$ and $SCR_2$ are not conducting. A positive pulse is delivered into the primary of transformer $T_1$ by transistor $Q_2$. This pulse is coupled to the secondary windings of transformer $T_1$ and appears as a negative pulse at the gate of $SCR_1$ and a positive pulse at the gate of $SCR_2$ and therefore $SCR_2$ conducts. Capacitor $C_3$ charges to the applied voltage less the voltage drop across $SCR_2$. The pulse shaper circuit is operational at this time. At 170 milliseconds after the first positive pulse is delivered to the primary winding of transformer $T_1$, a negative pulse is fed into the transformer by transistor $Q_2$. This pulse is again coupled to the gates of the SCR's and $SCR_1$ is triggered to the on state.

As rectifier $SCR_1$ conducts, it rapidly discharges capacitor $C_3$ providing an instantaneous low resistance path for the $SCR_2$ load current. This causes the current into $SCR_2$ to drop below the amount necessary to maintain conduction. Rectifier $SCR_2$ ceases conducting and disables the pulse shaper circuit 128. Capacitor $C_3$ then recharges to a voltage equal to its previous value but opposite in polarity. After 30 milliseconds, $SCR_2$ is again triggered when a positive pulse is fed to the primary of transformer $T_1$ by transistor $Q_2$. Rectifier $SCR_2$ conducts permitting the pulse shaper circuit 128 to become operational and discharging capacitor $C_3$. The discharge of capacitor $C_3$ provides an instantaneous low resistance path for the $SCR_1$ load current and $SCR_1$ ceases conduction. In this manner, the two SCR's are alternately triggered on at intervals controlled by the time base 124.

Pulse shaper circuit 128 is a monostable multivibrator. Its function is to provide a pulse which is uniform in width and amplitude for each output pulse from the pulse generator 114 of FIGURE 8. The pulse shaper 128 consists of transistors $Q_5$ and $Q_6$, resistors $R_{15}$, $R_{16}$, $R_{17}$, $R_{18}$, $R_{23}$, and capacitor $C_5$. The load for this circuit consists of resistor $R_{19}$ and the primary winding of transformer $T_2$. Operation of the pulse shaper circuit is as follows:

Assume rectifier $SCR_2$ is conducting and therefore completing the path to ground for the circuit. The divider network of $R_{19}$, $R_{15}$, and $R_{16}$, provides a bias voltage for the base of transistor $Q_5$ below that which is necessary for conduction. Through resistor $R_{18}$ bias voltage is supplied to the base of transistor $Q_6$ which is sufficient for conduction. Therefore, in the stable state, transistor $Q_6$ is conducting and transistor $Q_5$ is non-conducting. The output signal from the pulse generator which is coupled from photodiode 44 through capacitor $C_4$, drives transistor $Q_5$ to conduction. As transistor $Q_5$ conducts, capacitor $C_5$ is discharged. The discharge of the capacitor $C_5$ is reflected to the base of transistor $Q_6$ as a negative pulse which drives transistor $Q_6$ to the non-conducting state. As transistor $Q_6$ approaches the non-conducting state, the voltage at its collector increases in the positive direction. This increase in voltage is also present at the base of transistor $Q_5$ through the divider network of resistors $R_{15}$ and $R_{16}$, and transistor $Q_5$ is driven to saturation. The base voltage of transistor $Q_6$ then begins increasing gradually as capacitor $C_5$ charges through resistor $R_{18}$. After a period of time determined by the RC time constant of capacitor $C_5$ and resistor $R_{18}$, this base voltage is sufficient to drive transistor $Q_6$ to conduction. As transistor $Q_6$ conducts the voltage at its collector and consequently at the base of transistor $Q_5$ decreases rapidly and conduction through capacitor $C_5$ ceases. The output of the pulse shaper network as seen across the load resistor $R_{19}$ is a constant amplitude rectangular pulse with a width determined by resistor $R_{18}$ and capacitor $C_5$.

The isolator network 130 consists of transformer $T_2$. It is used in the circuit to isolate the components in the transformer secondary from the DC voltage level of the pulse shaper network 128.

Integrator circuit 132 is comprised of resistor $R_{20}$ and capacitor $C_6$. The output pulses from the pulse shaper network 128 are coupled to the integrator circuit through the isolator transformer $T_2$. The time constant of capacitor $C_6$ and resistor $R_{20}$ is chosen to permit only an incremental portion of each pulse to charge the capacitor $C_6$. Diode $D_3$ prevents the charge from leaking to ground. In operation, capacitor $C_6$ has no initial charge. The first pulse delivered to the integrator network results in a small positive charge on the capacitor. The second pulse charge is added to the first since the charges remain on the capacitor. This process is continued with charges being accumulated for a period of time determined by the time base. The capacitor is then discharged and the charging process begins again. Since the time allotted for capacitor charging is a constant, the capacitor accumulates a charge which is proportional to the frequency of the pulses originating in the escapement accelerometer.

Reset circuit 136 consists of controlled rectifier $SCR_3$, diode $D_4$ and resistor $R_{21}$ and a secondary winding of transformer $T_1$. The purpose of this circuit is to discharge capacitor $C_6$ at intervals determined by the time base oscillator. The charge on capacitor $C_6$ provides the anode voltage for $SCR_3$. The secondary winding of $T_1$ in the gate circuit of $SCR_3$ provides a positive gate pulse for each positive pulse delivered to the primary. After the SCR is triggered by a positive gate pulse, conduction is sustained only until the charge remaining on capacitor $C_6$ is no longer sufficient to maintain holding current through $SCR_3$. When the charge decreases to that point, the SCR returns to the blocking state and the capacitor can again accumulate the charge. The resultant wave shape as seen across capacitor $C_6$ is illustrated at E in FIGURE 9.

Output amplifier 140 consists of transistors $Q_7$, and $Q_8$, resistor $R_{22}$, and an oscillograph galvanometer coil 146. The cascaded transistors $Q_7$ and $Q_8$ present a high input impedance to the charge on capacitor $C_6$ and consequently minimize the drain on the charge during the recording operation. The wave shape recorded by the oscillograph is identical to that shown across capacitor $C_6$ and is indicated at F in FIGURE 9. The amplitude of the wave is a function of the frequency of the pulses from the pulse generator. The pulse frequency is a function of the $g$ force exerted on the inertial weight and therefore the recorded output is a function of $g$ force.

Figure 10:
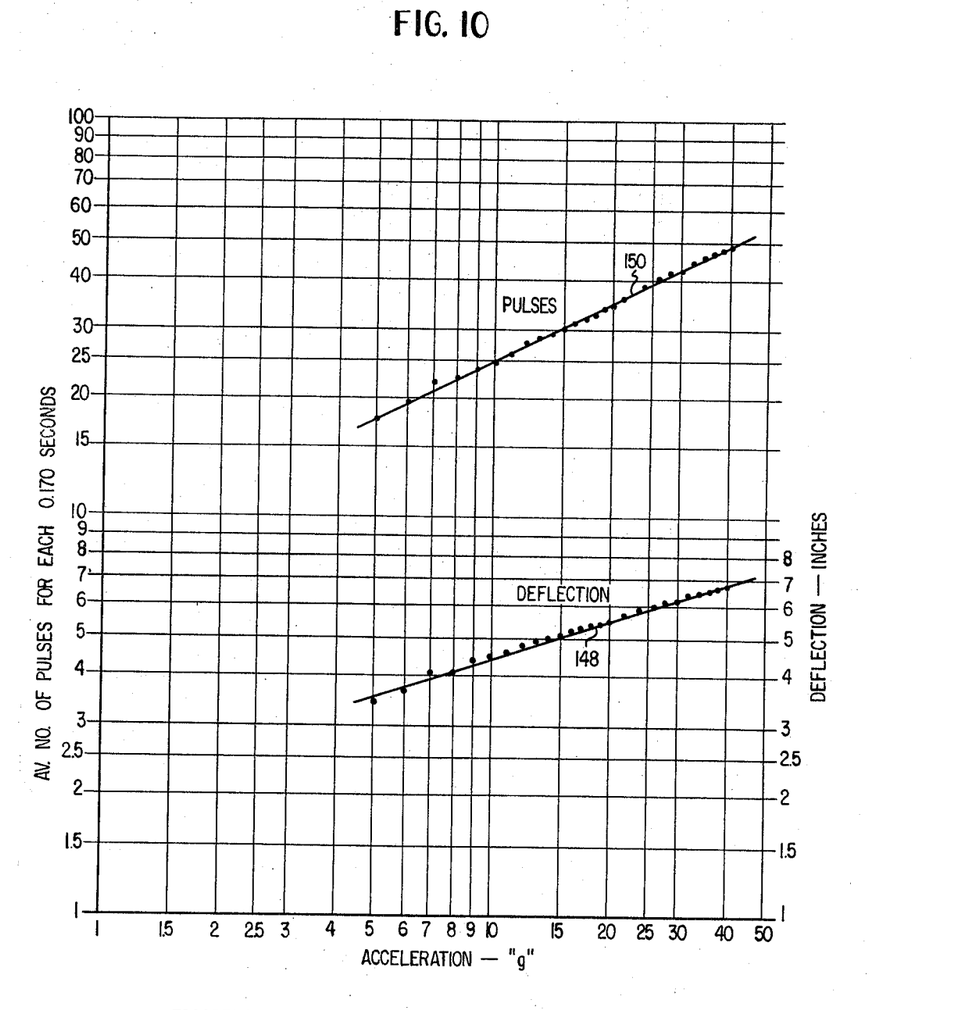
FIGURE 10 is plot of acceleration versus both the number of pulses and the deflection of the recorder for an accelerometer constructed in accordance with this invention.

Engineering tests have been conducted on a device constructed in accordance with the present invention. It performed satisfactorily in both ambient and $-65°$ F. to $160°$ F. temperature conditions. FIGURE 10 is a graph of the results of measurements taken when the escapement accelerometer was subjected to a gravity field between five and forty gravitational units. It should be noted that the logarithmic graph produces a straight line function since the sensed acceleration is a function of the square of the escapement frequency. FIGURE 10 portrays two parameters measured during the test. Curve 148 labeled "deflection" is the average deflection of the recorder galvanometer during a five second operation of the device at the indicated acceleration level. Curve 150 labeled "pulses" is a plot of the average number of pulses recorded at the indicated acceleration level during the same five second operation for each 0.170 second read-out period. Other data accumulated during tests show that the device is capable of at least a two percent accuracy without any further refinement.

It is apparent from the above that the present invention provides a novel accelerometer particularly suited for aerospace applications, but also usable in a wide variety of other environments. Important features of the device include the fact that it can be made quite small, reasonably accurate and comparatively inexpensively. The combination of a drive weight, gear train, escapement, photodiode and pulse generating electrical circuitry combine to produce an acceleration analog if desired or the circuitry can be modified to produce a digital type output. Additional advantages include low power consumption, and the fact that the device is impervious to rugged environments and easily reduced to conventional hardware.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An accelerometer comprising a movable inertial mass for sensing acceleration forces, a verge escapement including an oscillating pallet, means drivingly coupling said inertial mass to said pallet whereby said pallet is oscillated by movement of said inertial mass at a frequency representative of the acceleration force acting on said mass, counting means coupled to said pallet for counting said oscillations, and timing means coupled to said counting means for periodically causing the counting means to produce an output of the count therein to determine the oscillation frequency of said pallet.

2. An accelerometer according to claim 1 including a recorder coupled to said counting means for providing a continuous display of the oscillation frequency of said pallet.

3. An accelerometer according to claim 1 wherein said coupling means comprises a step up gear train.

4. An accelerometer according to claim 1 wherein said counting means comprises a light source and a photodetector adjacent said pallet, said pallet including means for modulating the light from said source to said photodetector at a rate representative of its frequency of oscillation.

5. An accelerometer comprising a movable inertial mass for sensing acceleration forces, a verge escapement including an oscillating pallet, a torque reduction gear train drivingly coupling said inertial mass to said pallet whereby said pallet is oscillated by movement of said inertial mass at a frequency representative of the acceleration force acting on said mass, a radiant energy source adjacent said pallet, and a photodetector adjacent said pallet for receiving radiant energy from said source, said pallet including means for modulating the radiant energy passing from said source to said detector at a rate representative of the oscillation frequency of said pallet.

6. An accelerometer according to claim 5 wherein said pallet has a radiant-energy window which oscillates through the path of said radiant energy passing from said source to said detector.

7. An accelerometer according to claim 5 wherein said inertial mass comprises an element mounted to move through a curved path.

8. An accelerometer according to claim 7 wherein said inertial mass comprises a rotatably mounted eccentric weight.

9. An accelerometer according to claim 5 wherein said inertial mass comprises an element mounted to move through a linear path.

10. An accelerometer according to claim 9 wherein said inertial mass comprises a movable rack.

11. An accelerometer according to claim 5 including electronic means coupled to said detector for accumulating electrical impulses from said detector over a predetermined time interval.

12. An accelerometer according to claim 11 including means for supplying signals from said accumulating means to a recorder.

References Cited

UNITED STATES PATENTS

| | | | |
|---|---|---|---|
| 1,432,375 | 10/1922 | Witt. | |
| 2,780,455 | 2/1957 | Devaney | 73—503 |
| 2,833,348 | 5/1958 | Almquist | 73—503 XR |
| 2,967,217 | 1/1961 | Alpert | 73—514 XR |
| 3,335,612 | 8/1967 | Stouffer | 73—516 XR |

RICHARD C. QUEISSER, Primary Examiner

J. J. GILL, Assistant Examiner

UNITED STATES PATENT OFFICE
CERTIFICATE OF CORRECTION

Patent No. 3,491,601          Dated January 27, 1970

Inventor(s) JOHN BERGEY and RAYMOND J. ANATER

It is certified that error appears in the above-identified patent and that said Letters Patent are hereby corrected as shown below:

The formula appearing at Column 4 between lines 30 and 34, should read as follows:

$$f = \frac{1}{2} \sqrt{\frac{Tr_p/r_w}{2I\phi}}$$

Column 5, line 25 "139" should read -- 138 --.

SIGNED AND SEALED

JUL 14 1970

(SEAL)
Attest:

Edward M. Fletcher, Jr.
Attesting Officer

WILLIAM E. SCHUYLER, JR.
Commissioner of Patents